(12) United States Patent
Langediers et al.

(10) Patent No.: US 8,397,352 B2
(45) Date of Patent: Mar. 19, 2013

(54) DECOMPRESSION-ELEMENT FASTENING SYSTEM FOR AN AIRCRAFT

(75) Inventors: Juergen Langediers, Syke (DE); Enno Cornelssen, Bremen (DE); Gerhard Penski, Wildeshausen (DE)

(73) Assignee: Airbus Operations GmbH, Hamburg (DE)

( * ) Notice: Subject to any disclaimer, the term of this patent is extended or adjusted under 35 U.S.C. 154(b) by 282 days.

(21) Appl. No.: 12/862,073

(22) Filed: Aug. 24, 2010

(65) Prior Publication Data

US 2011/0041293 A1   Feb. 24, 2011

Related U.S. Application Data

(60) Provisional application No. 61/236,196, filed on Aug. 24, 2009.

(30) Foreign Application Priority Data

Aug. 24, 2009   (DE) .................. 10 2009 038 644

(51) Int. Cl.
   *F16B 5/12*   (2006.01)
(52) U.S. Cl. .................... 24/291; 24/581.11; 24/458
(58) Field of Classification Search .............. 24/581.11, 24/289–297, 457–458, 602–603; 411/349, 411/549–553, 354, 75, 80; 244/132
See application file for complete search history.

(56) References Cited

U.S. PATENT DOCUMENTS

| | | | |
|---|---|---|---|
| 2,922,211 A * | 1/1960 | Boyd | 411/551 |
| 3,222,744 A * | 12/1965 | Dellith | 411/555 |
| 3,337,925 A * | 8/1967 | Meyer | 24/290 |
| 4,310,273 A * | 1/1982 | Kirrish | 411/338 |
| 4,716,633 A | 1/1988 | Rizo | |
| 4,890,966 A * | 1/1990 | Umezawa | 411/340 |
| 5,014,934 A | 5/1991 | McClaflin | |
| 5,314,144 A * | 5/1994 | Porter et al. | 244/132 |
| 5,580,204 A | 12/1996 | Hultman | |
| 5,795,118 A | 8/1998 | Osada et al. | |
| 6,129,312 A | 10/2000 | Weber | |
| 6,199,798 B1 * | 3/2001 | Stephan et al. | 244/129.4 |
| 6,261,042 B1 * | 7/2001 | Pratt | 411/551 |
| 6,409,446 B1 | 6/2002 | Schwarz | |
| 7,044,701 B2 * | 5/2006 | Herb | 411/84 |

FOREIGN PATENT DOCUMENTS

| | | |
|---|---|---|
| DE | 3704696 | 8/1987 |
| DE | 3715328 | 8/1988 |
| DE | 29920497 | 3/2000 |
| DE | 10 2007 061 433 | 7/2009 |
| EP | 0976645 | 2/2000 |

\* cited by examiner

*Primary Examiner* — Robert J Sandy
*Assistant Examiner* — Abigail E Morrell
(74) *Attorney, Agent, or Firm* — Wood, Herron & Evans, L.L.P.

(57) ABSTRACT

A decompression-element fastening system releasably fastens a trim component serving as a decompression element to a supporting structure in an aircraft internal region. The decompression fastening system includes at least one bolt, a screw for pressing the trim component in the direction of the supporting structure, and at least one detent element configured for resilient support on the supporting structure. The bolt has a bolt axis and on a first end at least one detent recess and on a second end a first thread. The screw is connected by a second thread to the bolt. The detent element upon approach of the bolt may slide over the first end thereof and come into engagement with the detent recess. If a predetermined tensile force acting in the direction of the bolt axis is exceeded, the detent element disengages from the detent recess.

17 Claims, 3 Drawing Sheets

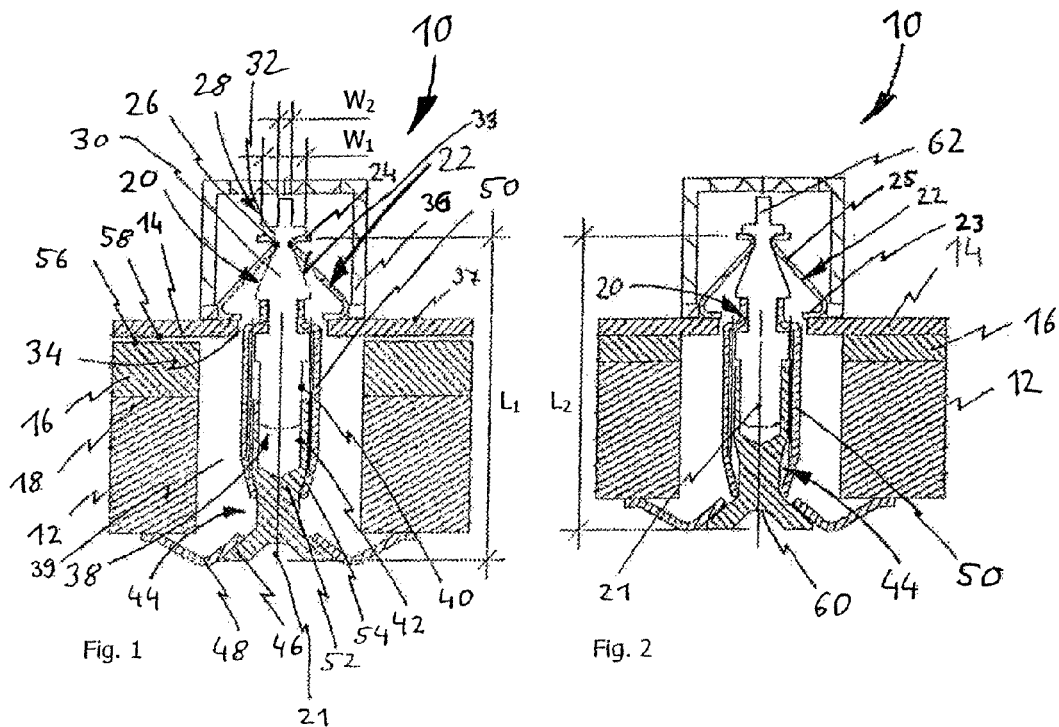
Fig. 1
Fig. 2
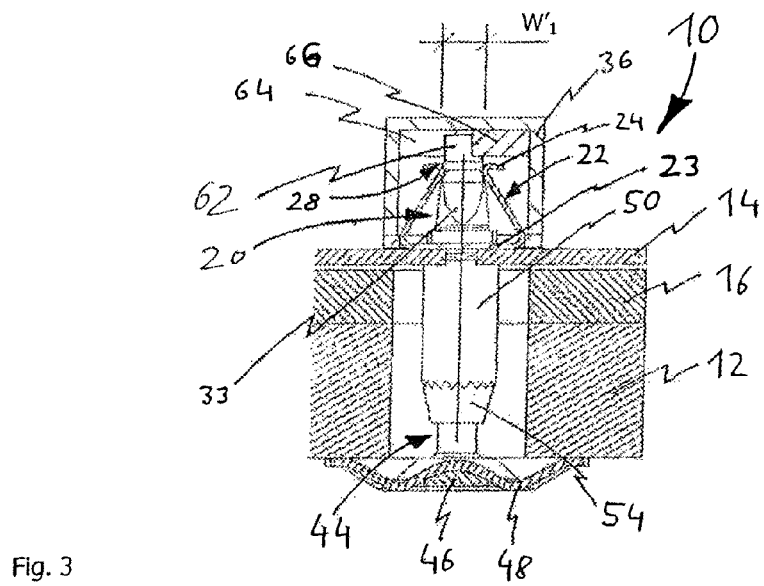
Fig. 3

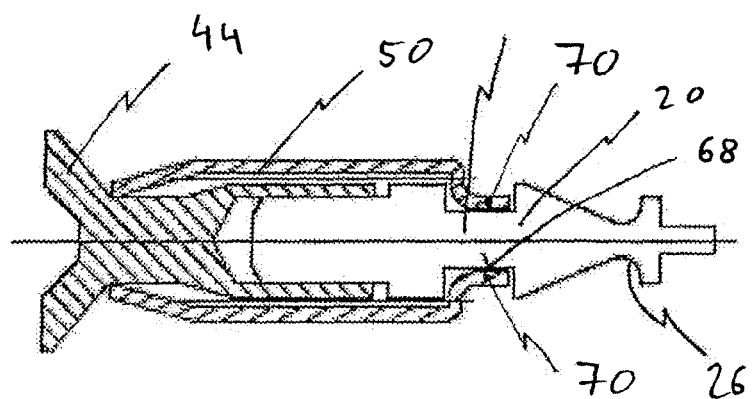
Fig. 4
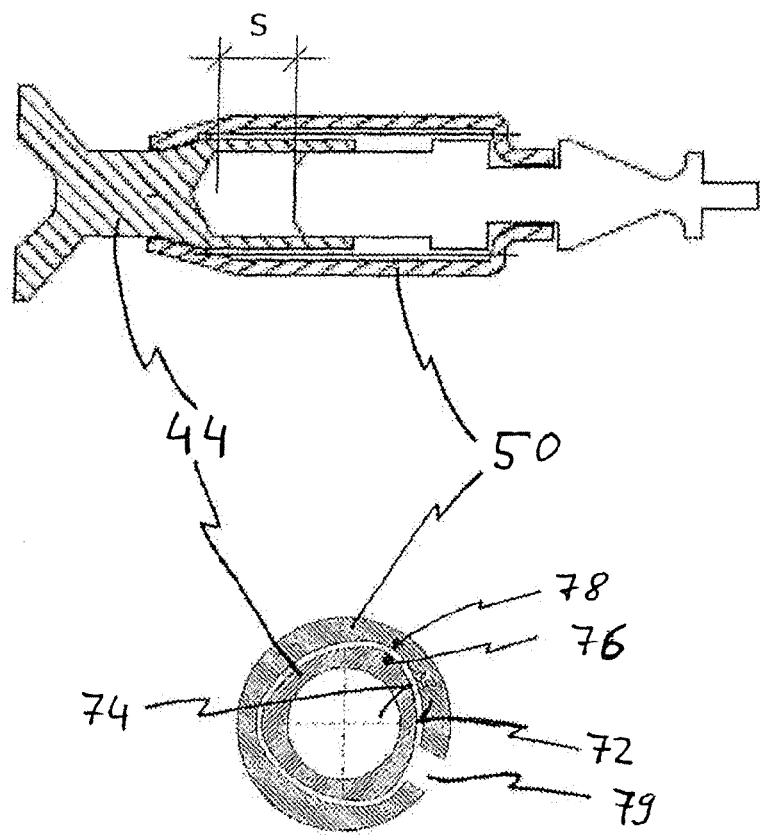
Fig. 5
Fig. 6

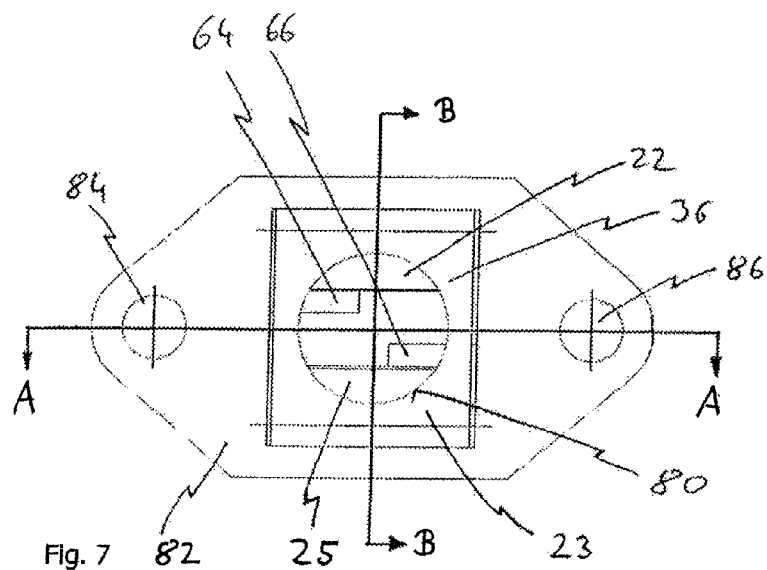
Fig. 7
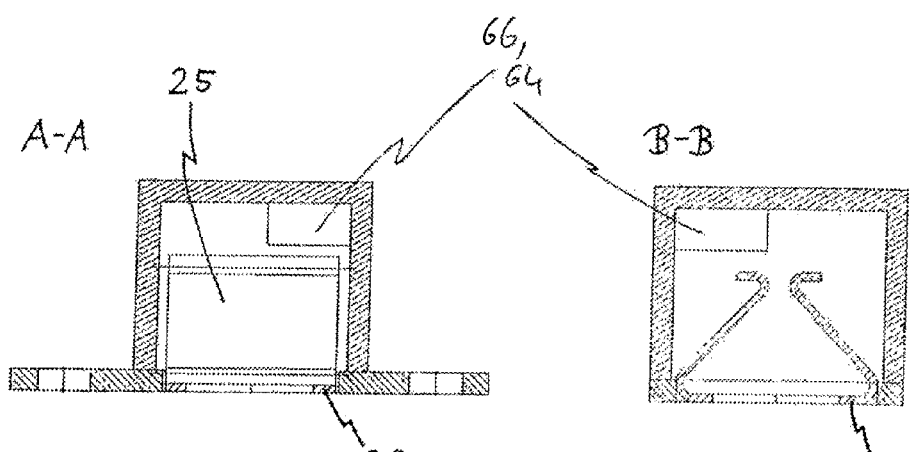
Fig. 8
Fig. 9

DECOMPRESSION-ELEMENT FASTENING SYSTEM FOR AN AIRCRAFT

CROSS-REFERENCE TO RELATED APPLICATIONS

This application claims priority to U.S. Provisional Patent Application No. 61/236,196, filed on Aug. 24, 2009; and/or to German Patent Application No. 102009038644.0, filed on Aug. 24, 2009.

TECHNICAL FIELD

The invention relates generally to a fastening system for trim- or subdividing elements that are to function as decompression elements. Such elements are used for example in an internal region of an aircraft. In particular the invention relates to a decompression-element fastening system that is intended for installation in an aircraft, for example a passenger aircraft.

BACKGROUND

An aircraft ambient pressure that is defined by the altitude-dependent atmospheric pressure varies considerably during a flight. At an altitude of around 5,500 m (ca. 18,000 ft) the external pressure has already dropped to approximately half of the atmospheric pressure prevailing at sea level before, on reaching a cruising altitude of is typically around 12,000 m (ca. 40,000 ft), dropping to less than a fifth. For this reason, passenger aircraft in particular have a pressurized cabin, the internal pressure of which is maintained during flying at a raised pressure level compared to the reduced external pressure, for example by means of tapped air removed from a compressor stage of an engine. To regulate the cabin pressure, cabin air may be released into the atmosphere through outlet valves. In the course of a normal flight the cabin pressure at cruising altitude corresponds approximately to the atmospheric pressure at an altitude of 2,400 m (ca. 8,000 ft).

The pressurized cabin is conventionally subdivided by partitions and/or intermediate floors into mutually separate areas, such as for example cockpit, passenger cabin, crew rest compartment (CRC), top deck, main deck or cargo compartments. In the event of a pressure drop in one area, for example as a result of damage to the pressurized cabin or failure of the outlet valve, the result is a pressure difference inside the aircraft compared to adjacent areas. The non-uniform pressure distribution inside the aircraft produces a force distribution, for which a primary structure of the aircraft is not optimized, and may lead to damage of the primary structure or to damage of the partitions and/or the intermediate floors that separate the decompressed area from the surrounding areas. In order to avert the potentially serious consequences of such damage, in the event of decompression it is necessary to achieve a rapid pressure compensation between the areas. For this reason, according to the prior art in partitions and/or intermediate floors decompression frames with flaps or decompression frames that are closed by means of breakable retaining elements are provided.

The printed document DE 37 15 328 C1 describes a decompression frame in a partition separating off the cargo compartment. The decompression frame is closed by means of a decompression panel that is held by leaf springs having predetermined breaking points. The decompression frame reacts both in the event of "blow-in" decompression (pressure propagating from the passenger cabin into the cargo compartment) and in the event of "blow-out" decompression (pressure propagating from the cargo compartment into the passenger cabin).

The printed document DE 10 2007 061 433 A1 describes a decompression frame, on which a flap is mounted by means of a hinge- or bearing element on the decompression frame. By means of a setting screw and a spring a pressure difference, upon which the flap opens in the event of decompression, is adjustable.

The discharge of cabin air is effected as a rule through air outlet channels that are disposed in the region of a cabin floor or a portion of side trim panels that is situated near the floor. In the event of a sudden pressure drop there is a risk of damage to the side trim with considerable potential endangerment of aircraft occupants. Here too, in the event of decompression a rapid pressure compensation between the cabin area and an area separated by trim components, in particular panels, from an aircraft skin is necessary.

For this purpose, the printed document U.S. Pat. No. 6,129,312 describes a decompression frame disposed in the side trim panel and having a screen, on which is surface-mounted a baffle plate that limits the discharge of cabin air. For the accelerated pressure compensation from the passenger cabin into the air outlet channel, in the event of decompression fastening points of the baffle plate to the decompression screen break so that the flow cross section is widened to the greater part of the decompression screen.

These known decompression frames however often do not satisfy the requirements of rapid decompression with an air flow rate high enough to prevent damage to the primary structure, the skin, the partitions and/or the intermediate floors. Furthermore, flaps, closing panels and associated retaining- and hinge elements add undesirable extra weight to the aircraft interior fittings or to the construction of the primary structure of the aircraft.

The object of the present invention is to remedy this.

SUMMARY OF THE INVENTION

The object is achieved according to the invention by a decompression-element fastening system for releasably fastening a trim component serving as a decompression element to a supporting structure in an aircraft internal region having the features described below. Accordingly, at least one bolt, a screw and at least one detent element configured for resilient support on the supporting structure are provided. The bolt has a bolt axis and on a first end at least one detent recess and on a second end a first thread. The screw is connected by a second thread to the bolt and configured for pressing the trim component in the direction of the supporting structure. As the bolt approaches the detent element, the detent element may slide over the first end of the bolt and come into engagement with the detent recess. If a predetermined tensile force acting in the direction of the bolt axis is exceeded, the detent element disengages from the detent recess.

It is therefore possible, without any substantial increase in weight compared to a simple screw connection, to fasten the trim component to the supporting structure. In the event of decompression in the aircraft internal region, a decompression pressure difference exerts via the trim component and each screw a tensile force on each bolt that, if the predetermined tensile force is exceeded, within an extremely short time releases, i.e. withdraws, the bolt or bolts from the detent element and hence brings about a rapid pressure compensation that prevents the occurrence of structure-endangering forces. The flow cross sections achievable thereby markedly surpass the flow cross sections achievable by conventional flaps and individual frames. What is more, the bearing- and fastening elements of the flaps and/or individual frames and the weight and maintenance work that they entail are rendered entirely redundant by the invention.

Here, by the term "bolt axis" is meant the longitudinal axis of the bolt. The first end and the second end of the bolt are preferably arranged mutually opposed on the bolt axis and the first thread and the second thread may be parallel to (preferably even coaxial with) the bolt axis.

The supporting structure may be a primary- or secondary structure of the aircraft. Alternatively, the supporting structure may be a retaining structure specially for fastening the trim component (and/or decompression element).

The detent recess may be formed for example by a local notch (or a circumferential groove) on the bolt or by a laterally protruding projection.

There is preferably disposed between the trim component and the supporting structure a seal, against which in a screwed-in (first) position of the screw the supporting structure and the trim component lie in a pressure-tight manner. A pressure-tight separation of individual aircraft internal regions may therefore be combined with a rapid pressure compensation facility in the event of decompression. For example, differently air-conditioned areas may therefore be defined and maintained in an energy-efficient manner. It is also possible to prevent a propagation of undesirable odours from a cargo compartment into a passenger compartment. Furthermore, a use in the cargo compartment of flameproofing gases that are injurious to health does not affect passengers. A decompression pressure difference is also not reduced in a delayed manner by non-tight trim components, which results in a shortened response time of the decompression-element fastening system. Rather, in the event of decompression the entire load of the decompression pressure difference may act immediately upon the trim component serving as a decompression element and hence shorten the response time thereof.

To simplify assembly, the seal may be bonded at one side either to the supporting structure or to the trim component. In order to compensate surface irregularities or tolerances (of the trim component or the supporting structure) and also achieve sound insulation, the seal may be a resilient foam material that is compressible by the pressure (transmitted by the bolt and the screw) in the screwed-in (first) screw position.

To achieve a simplified bearing arrangement of the detent element or to achieve a higher predetermined tensile force, a lead-through opening may be provided in the supporting structure (for lead-through of the first end of the bolt) and the detent element may be disposed on a side of the supporting structure remote from the trim component (in lead-through direction behind the lead-through opening). The tensile force on the latched bolt may therefore be transmitted to the supporting structure by compressive forces of the detent element via the resilient support thereof.

Furthermore, the predetermined tensile force may be predetermined by means of a flexural buckling mechanism (approximately by means of the Euler's buckling modes) of the resiliently supported detent element.

In order to make the decompression-element fastening system pressure-tight at the opening in the supporting structure, the leadthrough opening and the detent element may be surrounded by a pressure-tight housing. For example, on the side of the lead-through opening remote from the trim component the housing may form an enclosure that is connected in a pressure-tight manner to the supporting structure. Thus, the advantages of a detent element disposed at the rear of the supporting structure are combined with those of a pressure-tight decompression-element fastening system.

In a preferred embodiment a sleeve is fastened (preferably in a rotationally fixed manner) to the bolt and projects beyond the second end of the bolt so that the screw in a screwed-out (second) position comes into contact with a taper of the sleeve. The screw is therefore secured against loss. Screw and bolt may further form a preassembled unit, wherein the sleeve holds the unit together. In the case of the rotationally fixed fastening of the sleeve to the bolt, the contact of the screw with the taper is preferably friction-locking in order to transmit a torque from the screw to the sleeve and hence also to the bolt.

To lock the screw against rotation, for example against an automatic opening or unscrewing of the screw as a result of in-flight vibration, the lateral surface of the screw may have a (circumferential) external profile that interacts in a positive or friction-locking manner with a complementary internal profile of the sleeve. For example, the mating external and internal profiles may have a wave shape. The rotational locking may then be overcome only by two wave crests sliding one over the other. A rotation-locking moment needed to overcome the rotational locking is preferably selected greater than vibration moments induced by vibrations at the screw and selected lower than a locking moment, which is exerted on the bolt by the detent element resting against the detent recess and holds the bolt in the rotation-locking position. The screw in any position between the screwed-in (first) position and the screwed-out (second) position is therefore protected against vibration and (yet) rotatable without the turning of the screw simultaneously rotating the latched bolt.

For defining the rotation-locking moment, the sleeve may further have a longitudinal slot and be manufactured from a spring-elastic material. In this case, overcoming the rotational locking entails a widening of the longitudinal slot, with the result that the rotation-locking moment may be determined from the shear modulus of the sleeve.

For improved axial guidance of the bolt, on the first end at least two opposite detent recesses may be provided. In order to ensure a defined axial locking depth of the bolt, on the opposite detent recesses at the first end of the bolt there may moreover be wedge-shaped run-on slopes that widen in the direction of the second end. The run-on slopes may be almost planar surfaces or (in the case of a rotationally symmetrical bolt) conical. The locking depth of the bolt is defined by the engagement of the detent elements into the detent recesses. In the event that the bolt during assembly approaches the detent element to an extent exceeding the locking depth (for example as a result of being excessively pressed in), wedge forces press the bolt back until the defined locking depth is reached.

The opposite detent recesses may have a (smaller) internal dimension and a (larger) external dimension. Furthermore, the bolt at right angles to the opposite detent recesses may have a substantially uniform transverse dimension. The transverse dimension is a dimension extending substantially transversely of the longitudinal axis of the bolt, i.e. the transverse dimension is substantially perpendicular to the longitudinal axis of the bolt and perpendicular to the external/internal dimension. Thus, the latched bolt (in addition to the predetermined locking depth) may occupy a defined rotary locking position. In this way, a defined rotary position of the sleeve connected to the bolt may also be realized.

To achieve the advantage of easy releasability and removability of the bolt during a disassembly of the decompression-element fastening system, the transverse dimension may be substantially identical to the external dimension. Upon a rotation of the latched bolt through 90°, the mutually opposite detent elements then run out of the detent recesses along a non-circular (for example ellipsoidal) bolt circumference. In this case, the detent element is widened or spread from the internal dimension to the external dimension. By virtue of such a rotation the opposite detent elements may leave their detent recesses without a large expenditure of force (in particular without applying the predetermined tensile force) and the bolt may occupy a release position (rotated through 90° compared to the rotary locking position).

Alternatively, the detent recess on the first end may take the form of a circumferential groove on the bolt. In this case, the bolt in the locking position is rotatable without the detent element and detent recess becoming disengaged. In order, in this case too, to simplify disassembly, (for each of the detent elements) two opposite longitudinal grooves may further be provided on the first end of the bolt. These longitudinal grooves then likewise define a release position of the bolt, in which the detent elements are released from the circumferential detent recess and may slide along the longitudinal grooves (from the first end of the bolt).

Such a rotation between locking position and release position of the bolt may be elegantly realized (in both embodiments) particularly in combination with the sleeve fastened to the bolt in that a (further) rotation of the screw in the screwed-out (second) position rotates the bolt out of the locking position into the release position. The screw, which in the screwed-out (second) position rests in a rotationally fixed manner against the sleeve, may transmit a torque to the sleeve fastened to the bolt and hence rotate the bolt. For this purpose an (anticlockwise) rotation, which has brought the screw into the screwed-out (second) position, merely has to be continued for a further quarter turn. In particular, the rotation of the screw in the screwed-out (second) position may press each of the detent elements (associated with the at least one bolt) out of the engagement thereof with the detent recess.

To prevent a rotation of the bolt beyond the quarter turn, at least one (fixed) stop may be provided on the supporting-structure side and the bolt may have on its first end an extension (serving as a rotatable stop), which in the release position of the bolt rests against the stop. Disassembly is therefore simplified in that a rotation, which conveys the screw out of the screwed-in (first) position into the screwed-out (second) position, may be continued "blindly" beyond the screwed-out (second) position with simultaneous entrainment of the bolt up to attainment of the release position. The changeover of the turning mechanism from screwing motion to sleeve rotation occurs in this case automatically and remains unnoticed by a user.

To save space, the screw may have an internal thread, into which an external thread of the bolt engages. Also, the portion of the screw having the (circumferential) external profile may simultaneously have the internal thread at an inner side in order to achieve a more compact design and reduce weight.

The predetermined tensile force of the decompression-element fastening system may, for rapid response in the event of decompression, be tuned with an effective surface of the trim component, which is fastened by means of the decompression-element fastening system, and an anticipated decompression pressure difference as well as a number of further bolts (or fastening points). The predetermined tensile force may be selected lower than (and in the same order of magnitude as) a decompression force. The decompression force may be determined in a first approximation from the product of effective surface and decompression pressure difference divided by the number of bolts.

To comply with specified burn-through times, the decompression-element fastening system, in particular each bolt, may be manufactured from fireproof, preferably metal materials.

The trim component may have a plurality of through-holes for receiving in each case one bolt of the decompression-element fastening system as well as at least partially resilient sealing surfaces. The resilient sealing surfaces may be brought into contact with retaining surfaces of a supporting structure of the aircraft. As a decompression pressure difference acts upon the entire surface of the trim component, the decompression-element fastening system has substantially shorter response times than conventional decompression frames and moreover enables a more rapid pressure compensation owing to the considerably larger flow cross section.

Alternatively or in addition to rotational locking integrated in the decompression-element fastening device, lock washers may be provided at the through-holes. A head of each screw may be supported via the lock washer on the trim component. To simplify assembly, the lock washers together with the trim component may form an assembly unit and offer particularly simple securing of the screws against in-flight vibrations.

BRIEF DESCRIPTION OF THE DRAWINGS

Further advantages and features of the invention emerge from the following detailed description of an embodiment with reference to the diagrammatic figures. These show:

FIG. 1 a sectional view of a decompression-element fastening system according to the invention with latched bolt and in a screwed-out position of a screw;

FIG. 2 the sectional view of the decompression-element fastening system of FIG. 1 in a screwed-in position of the screw;

FIG. 3 the sectional view of the decompression-element fastening system of FIG. 1 in the screwed-in position of the screw and in a release position of the bolt;

FIG. 4 a sectional view of a trim-side unit comprising the screw, the bolt and a sleeve, in the screwed-in position;

FIG. 5 a sectional view of the unit of FIG. 4 in the screwed-out position;

FIG. 6 a cross section of a rotational locking of the screw that is integrated in the unit of FIGS. 4 and 5;

FIG. 7 a plan view of a structure-side unit comprising a detent element;

FIG. 8 a sectional view of the unit of FIG. 7 parallel to the detent element; and FIG. 9 a sectional view of the unit of FIG. 7 transversely of the detent element.

DETAILED DESCRIPTION

FIG. 1 shows a decompression-element fastening system denoted generally by 10, which is provided for decompression-sensitive fastening, i.e. in a decompression situation automatically releasable fastening, of a trim component 12 acting as a decompression element to a supporting structure 14 in an aircraft internal region. The illustrated cutting plane is perpendicular to the trim component 12 and extends through the fastening point.

For pressure-tight subdivision of the aircraft internal region there is bonded to the trim component 12 a foam material seal 16, which in the present embodiment is made from the fire-retardant silicone elastomer ABS5006. The seal need not be applied to the entire surface of the side 18 of the trim component 12 facing the supporting structure 14. Rather, a seal 16 in the form of a (for example circular) band surrounding the fastening point is sufficient for the pressure-tight construction. If a plurality of individual trim components 12, for example (overhead) panels are used to subdivide a region, there are likewise seals between the trim components at mutually adjoining edges (not shown) of the trim components 12.

On the supporting structure 14 a detent element 22, which interacts with a bolt 20 at two opposite sides of the bolt 20 and is preloaded in the direction of a bolt axis 21, is formed in the present embodiment by a leaf spring. The detent element 22 has a base 23 parallel to the supporting structure 14 as well as two arms 25 extending from it out of the plane of the base 23 and symmetrically in relation to the bolt axis 21, such that the base 23 and the two arms 25 form an approximately triangular cross-sectional profile of the detent element 22. Ends 24 of the arms 25 are flanged outwards. The detent element 22 extends with planar surfaces at right angles to the cutting plane of FIG. 1 and, in a locking position of the bolt 20 shown in FIG. 1, rests with each of its ends 24 against one of two detent recesses 26 on a first end 28 of the bolt 20 facing the supporting structure 14. The detent recesses 26 are formed from a wedge body 30 tapering in the direction of the first end 28 as well as two projections 32 extending in the cutting plane shown in FIG. 1 transversely of the axis of the bolt 20.

To manufacture the wedge body 30, for example from an approximately cylindrical or slightly conical bolt portion the wedge shape of the wedge body 30 is cut out, which tapers linearly in the direction of the detent recess 26 and has two opposite run-on faces 33 on the bolt 20. In this case, the bolt 20 tapers only in a transverse axis (lying in the cutting plane of FIG. 1) as far as a base of the detent recess 26 to an internal dimension $W_2$ and widens at the lateral projections 32 to an external dimension $W_1$. In a second transverse axis of the bolt 20 that is perpendicular to the transverse axis shown in FIG. 1 a transverse dimension of the bolt 20 along the first end 28 remains unaltered, as is described in detail below with reference to FIG. 3.

On the supporting-structure side the bolt 20 projects through an opening 34 in the supporting structure 14 and reaches the detent element 22 there. In order to block a fluidic connection through the opening 34 between the internal regions to be separated, the opening 34 including the detent element 22 is surrounded by a housing 36, which at a side 37 of the supporting structure 14 remote from the trim component 12 is blanked off in a pressure-tight manner by, and connected in a stable manner to, the supporting structure 14.

On the trim side a second end 38 of the bolt 20 projects into a through-hole 39 of the trim component 12. At the second end 38 an external thread 40 of the bolt 20 engages into a corresponding internal thread 42 of a screw 44. A screw head 46 of the screw 44 is situated positively in a lock washer 48, via which the screw 44 may press the trim component 12 towards the supporting structure 14.

In the—relative to the bolt 20—screwed-out position of the screw 44 shown in FIG. 1, a length $L_1$ from the detent recess 26 to the screw head 46 is at its greatest. By to means of a sleeve 50 clamped in a rotationally fixed manner on the bolt 20 a further screwing-out of the screw 44 is prevented in that, upon attainment of the screwed-out position of the screw 44, a shank 52 of the screw 44 that widens in the direction of the internal thread 42 strikes against a narrowing end portion 54 of the sleeve 50. On the one hand, this prevents an inadvertent disengagement of the threads 40, 42. On the other hand, wedge forces acting between the shank 52 and the end portion 54 produce a friction locking that allows a torque to be transmitted from the screw 44 to the sleeve 50.

To assemble the decompression-element fastening system 10, in a first step a unit comprising the bolt 20, the screw 44 and the sleeve 50 is pressed into the opening 34, wherein the projections 32 spread the detent element 22 so that its ends 24 slide over the first end 28 of the bolt 20 before engaging into the detent recesses 26 under the effect of initial tension upon reaching the locking position of the bolt 20. As the screw 44 in this case is in the screwed-out position, reaching the locking position does not entail any particular expenditure of force. In the event of too deep an introduction of the bolt 20, the run-on faces 33 of the wedge body 30 ensure that the bolt is pushed back under the effect of the spring action of the detent element 22 or of the arms 25 of the detent element 22 running up along the run-on faces 33 with the ends 24 into the detent recesses 26. Thus, in the locking position a defined locking depth of the bolt 20 is provided.

The bolt 20 may then, i.e. in the locking position, be subjected to tensile loading up to the exceeding of a predetermined tensile force, upon which the ends 24 of the detent element 22 are pushed out of the detent recesses 26. A typical order of magnitude for the predetermined tensile force per bolt 20 is 750 N.

To complete assembly of the decompression-element fastening system 10, in a second step the screw 44 is screwed in, wherein the distance between detent recess 26 and screw head 46 is shortened from $L_1$ in the screwed-out position to $L_2$ in a screwed-in position shown in FIG. 2. In this case, a surface 56 of the seal 16 is pressed against a side 58 facing the trim component 12. Any irregularities in the faces 56, 58 as well as tolerances in the trim component 12 and the supporting structure 14 are compensated by the resilience of the seal 16, which in the screwed-in position is compressed to approximately half of its original layer thickness.

The screw 44 has on the screw head 46 a torx coupling 60, by means of which the screw 44 is tightened with a defined torque, preferably between 0.4 Nm and 0.8 Nm, in the screwed-in position. As the contact pressure is generated by the thread pairing 40, 42, the pressing-on of the seal likewise entails no particular expenditure of force during assembly.

This concludes the assembly at the fastening point shown in FIGS. 1 and 2. A complete decompression system (not shown) comprises a plurality of such fastening points and during assembly first the bolts 20 disposed in corners of the trim component 12 are pressed into the locking position in order to roughly fix the trim component 12. Fine adjustment follows in the course of the second step of screwing in the screws 44.

FIG. 3 shows the disassembly of the decompression-element fastening system 10. In a first disassembly step the screw 44 is rotated out of the screwed-in position of FIG. 2 into the screwed-out position of FIG. 1. In this case, the resilient seal 16 expands.

In a second disassembly step, which seamlessly follows the first step for simplifying disassembly, by means of a further quarter turn of the screw 44 (in the same turning direction as during the first disassembly step) via the screw 44 resting in a friction-locking manner against the narrowed end portion 54 a torque is transmitted to the sleeve 50, with the result that sleeve 50 and the bolt 20 connected in a rotationally fixed manner to the sleeve rotate through 90°. In this case, the detent element 22 is spread to the transverse dimension $W'_1$, which extends at right angles to the external dimension $W_1$ shown in FIG. 1 and is shown in FIG. 3. In the illustrated embodiment the transverse dimension corresponds to the external dimension $W_1$. In this release position of the bolt 20, an extension 62 configured as a rotatable stop rests against two fixed stops 64, 66 oppositely arranged in the housing 36 and prevents an over-turning (beyond the release position) of the unit comprising screw 44, bolt 20 and sleeve 50.

In the release position of the bolt 20, the flanged ends 24 of the arms 25 of the detent element 22 may slide, without running into a retaining detent recess 26, with a slight expenditure of force over the first end 28 of the bolt 20, because the detent element up to the bolt has a substantially uniform transverse dimension $W'_1$. With the removal of the unit 20, 44, 50 from the through-opening 39 disassembly of the fastening point is complete.

The afore-mentioned extension 62 moreover already during the first disassembly step interacts with the detent element 22 in such a way that the bolt 20, as it is pressed in, automatically assumes the rotary position shown in FIGS. 1 and 2 (and not the rotary position rotated through 90° that corresponds to the release position of FIG. 3).

FIGS. 4 and 5 show enlarged individual sectional views of the trim-side unit comprising the screw 44, the sleeve 50 and the bolt 20. On the bolt 20 flattened portions 68 are arranged opposite one another, on which flat portions 70 of the sleeve 50 rest in a cramped manner and establish a rotationally fixed connection between sleeve 50 and bolt 20.

A detailed geometry of the detent recesses 26 together with a geometry of the detent element 22 defines the predetermined tensile force, up to which the detent recesses 26 may transmit tensile forces via the detent element 22 to the supporting structure 14.

FIG. 5 shows a screw-in travel $S=L_1-L_2$ between the screwed-in position shown in FIG. 4 and the screwed-out position of the screw 44 shown in FIG. 5.

By virtue of a rotational locking of the screw 44 relative to the sleeve 50 that is shown in FIG. 6 the screwed-in position, the screwed-out position and intermediate rotary positions of the screw are secured against vibrations that occur in flight. The rotational locking is fully integrated into the unit shown in FIGS. 4 and 5, in which an outer side 72 of the screw 44 has a trigonal wave-shaped circumferential profile that interacts with a complementary circumferential profile formed on an inner side 74 of the sleeve 50. In a rotationally locked position of the screw 44 a wave crest 76 on the side 72 coincides with a wave trough 78 on the side 74. The rotation-locking moment is the torque needed to push wave crests across one another. As this entails a widening of the sleeve diameter, the sleeve has a longitudinal slot 79. The rotation-locking moment may be calculated and defined from a surface friction between the outer side 72 and the inner side 74 as well as from a shear modulus of the sleeve material.

FIG. 7 shows a supporting-structure-side unit comprising the detent element 22, a bore 80 in the base 23 of the detent element 22 that is concentric with the opening 34, the fixed stops 64 and 66, and a rivet plate 82 with rivet holes 84 and 86 for riveting the supporting-structure-side unit shown in FIG. 7 to the supporting structure 14. Sectional views parallel to the detent element 22 (A-A) and transversely of the detent element 22 (B-B) are shown in FIGS. 8 and 9 respectively.

A non-illustrated embodiment of the decompression-element fastening system uses an overhead panel of a cargo compartment as trim component 12. In the event of a pressure drop in the cargo compartment, the decompression-element fastening system 10 releases the overhead panel from a secondary structure of the aircraft (so-called "blow-in" decompression).

The decompression-element fastening system 10 according to the invention combines five functions in one device. Firstly, in the course of a normal flight a trim component is retained on the primary- or secondary structure of the aircraft by means of the decompression-element fastening system 10.

Secondly, in the event of rapid ("explosive") decompression the decompression-element fastening system 10 operates under the load of the decompression differential pressure at 40 to 100 hPa, preferably at 80 hPa, within less than 0.2 seconds. This already means that the decompression-element fastening system 10 combines two tasks, previously achieved independently of one another, in one component with improved performance data and with reduced weight.

Thirdly, by virtue of a suitable choice of material the certification specification CS 25,855 (c), appendix F, part III of the European Aviation Safety Agency (EASA) relating to burn-through behaviour may be met by the decompression-element fastening system 10.

Fourthly, the certification specification CS 25,365 (e) relating to tightness may be met by the decompression-element fastening system 10 (optionally including the seal 16). By virtue of the contact pressure exerted on the seal 16 by the decompression-element fastening system 10 the tightness of the trim components may be guaranteed also in the event of fire, so that the concentration of fire extinguishing agents (for example halogenated hydrocarbons, also known as halons) enclosed for example in the cargo compartment continues to be maintained for the specified ETOPS time. This tightness in the course of normal flight further allows independent air-conditioning or ventilation of the cargo compartment. To prevent an air flow out to of the cargo compartment, a ventilation function in the cargo compartment operates with a slight underpressure compared to the passenger cabin, for example of −0.5 mbar.

Fifthly, the decompression-element fastening system 10 enables a service period of 1500 installation- and disassembly cycles. In this case, the detent element 22 with the repeated spreading is not a limiting factor, so that it is substantially only abrasion at the detent recesses 26 that is considered an influence limiting the service period since (as mentioned previously with reference to FIG. 4) the geometry of the detent recesses 26 has an influence upon the precisely predetermined tensile force.

The invention claimed is:

1. A decompression-element fastening system for releasably fastening a trim component serving as a decompression element to a supporting structure in an aircraft internal region, comprising:
   a bolt which has a bolt axis, at least one detent recess on a first end, and a first thread on a second end,
   a screw including a second thread and connected by the second thread to the bolt, the screw also including a screw head at an end portion opposite to the second thread, the screw head positioned to press the trim component towards the supporting structure when the screw is moved to a screwed-in position relative to the bolt, and
   at least one detent element coupled to the supporting structure for resilient support, the detent element positioned such that when the bolt approaches the detent element during fastening of the trim component to the supporting structure, the detent element slides over the first end of the bolt and engages with the associated detent recess, wherein the detent element is sufficiently resilient to disengage from the detent recess by sliding over the first end of the bolt if a predetermined tensile force acting in the direction of the bolt axis is exceeded, thereby unfastening the trim component from the supporting structure.

2. The system according to claim 1, further comprising:
   the supporting structure, wherein the detent element is coupled to a side of the supporting structure facing away from the trim component, and the supporting structure has a lead-through opening.

3. The system according to claim 2, further comprising:
a pressure-tight housing surrounding the lead-through opening and the detent element.

4. The system according to claim 1, further comprising:
a sleeve fastened to the bolt and projecting beyond the second end of the bolt, wherein the sleeve includes a taper and the screw in a screwed-out position relative to the bolt rests in a friction-locking manner against the taper of the sleeve to prevent further movement of the screw away from the bolt.

5. The system according according to claim 4, wherein a lateral surface of the screw has an external profile that interacts positively with a complementary internal profile of the sleeve.

6. The system according to claim 5, wherein the sleeve is spring-elastic and has a longitudinal slot.

7. The system according to claim 1, wherein the bolt includes at least two opposite detent recesses on the first end.

8. The system according to claim 7, wherein the at least two opposite detent recesses on the first end of the bolt include wedge-shaped run-on slopes that widen in the direction of the second end of the bolt.

9. The system according to claim 7, wherein the at least two opposite detent recesses have an internal dimension and an external dimension, and the bolt at right angles to the at least two opposite detent recesses has a substantially uniform transverse dimension.

10. The system according to claim 9, wherein the substantially uniform transverse dimension is at least substantially identical to the external dimension of the at least two opposite detent recesses.

11. The system according to claim 9, further comprising:
a sleeve fastened to the bolt and projecting beyond the second end of the bolt, wherein the sleeve includes a taper and the screw in a screwed-out position relative to the bolt rests in a friction-locking manner against the taper of the sleeve to prevent further movement of the screw away from the bolt, and wherein a further rotation of the screw in a screwed-out position relative to the bolt presses the at least one detent element out of engagement with the associated detent recess.

12. The system according to claim 11, further comprising:
the supporting structure; and
a stop provided on the supporting structure, wherein the bolt on the first end has an extension for interacting with the stop.

13. The system according to claim 11, wherein a lateral surface of the screw has an external profile that interacts positively with a complementary internal profile of the sleeve.

14. The system according to claim 11, wherein the sleeve is spring-elastic and has a longitudinal slot.

15. The system according to claim 1, wherein the detent element and the detent recess are formed with corresponding contours that enable the disengagement of the detent element from the detent recess in response to the application of a tensile force $F_{max}$ that is lower than a decompression force $F_{Dekomp}$ defined by the following formula:

$$F_{Dekomp} = \Delta p * (A/N),$$

wherein $\Delta p$ is a decompression pressure difference, A is an effective surface of the trim component, and N is the number of bolts fastening the trim component to the supporting structure.

16. The system according to claim 1, further comprising:
a lock washer arranged on the screw to support a head of the screw on the trim component.

17. The system according to claim 1, wherein the detent recess has an internal dimension and an external dimension, and the bolt at a right angle to the detent recess has a substantially uniform transverse dimension, the transverse dimension being substantially identical to the external dimension of the detent recess.

* * * * *